US006225391B1

(12) United States Patent
Parthasarathy et al.

(10) Patent No.: US 6,225,391 B1
(45) Date of Patent: May 1, 2001

(54) REDUCED VOLATILITY PRECURSORS TO ANTI-FOG AGENTS

(75) Inventors: Anju Parthasarathy, Glenmoore, PA (US); Steven Dale Ittel, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/485,603

(22) PCT Filed: Aug. 11, 1998

(86) PCT No.: PCT/US98/16585

§ 371 Date: Feb. 11, 2000

§ 102(e) Date: Feb. 11, 2000

(87) PCT Pub. No.: WO99/07789

PCT Pub. Date: Feb. 18, 1999

Related U.S. Application Data

(60) Provisional application No. 60/055,503, filed on Aug. 12, 1997.

(51) Int. Cl.[7] .................. C08K 5/5541; C08K 5/544; B32B 27/32
(52) U.S. Cl. .................. 524/269; 524/188; 524/265; 524/267; 524/262; 428/447; 428/500
(58) Field of Search .................. 524/262, 265, 524/267, 269, 188; 428/447, 500

(56) References Cited

U.S. PATENT DOCUMENTS

| 3,337,351 | 8/1967 | Morehouse | 106/13 |
|---|---|---|---|
| 3,933,407 | 1/1976 | Tu et al. | 350/61 |
| 5,336,707 * | 8/1994 | Nohr et al. | 524/269 |
| 5,344,862 * | 9/1994 | Nohr et al. | 524/269 |
| 5,436,041 | 7/1995 | Murschall et al. | 428/34.2 |

FOREIGN PATENT DOCUMENTS

| 32 44 955 * | 6/1984 | (DE) | 524/267 |
|---|---|---|---|
| 0158 140 A2 | 10/1985 | (EP) | C08L/23/00 |
| 0 335 407 A2 | 10/1989 | (EP) | C08L/23/00 |
| 0 645 425 A2 | 8/1995 | (EP) | C08L/23/02 |
| 0 747 460 A1 | 12/1996 | (EP) | C09K/3/18 |
| 7-164607 | 6/1995 | (JP) | B32B/27/32 |
| 899 592 * | 1/1982 | (RU) | 524/265 |
| WO 95/18845 | 7/1995 | (WO) | C09K/3/18 |
| WO 96/25451 | 8/1996 | (WO) | C08G/69/40 |

OTHER PUBLICATIONS

J.P. Trotoir, Antifog/antistat eases processing problems, *Modern Plastics*, 102–106, 1988.

* cited by examiner

Primary Examiner—Peter A. Szekely

(57) ABSTRACT

The present invention concerns compounds of Formula I $R^2_{4-z}Si[(Q)_xA(CH_2)_yH]_z$ or of Formula II $[H(CH_2)_yA(Q)_x]_b SiR^1_{3-b}SiR^1_{3-b}[(Q)_xA(CH_2)_yH]_b$, wherein Q is $OCH_2CH_2$, $OCH_2CHCH_2$, or any combination of one or more units of $OCH_2CH_2$ and $OCH_2CHCH_2$; A is O, $OC_6H_4$, S, NH, NR, O—C(O)—; R is alkyl, aryl, or alkaryl; x is greater than 2 and less than 100; y is greater than 0; except when $A=OC_6H_4$, then y is greater than or equal to 0; z is 1 to 4; and each $R^2$ is independently selected from the group consisting of alkyl, aryl and alkaryl; B is O, $C_6H_4$, —$(CH_2)_q$—, and hydrocarbylene; q is greater than 1 and less than 30; b is 1 to 3; and each $R^1$ is independently selected from the group consisting of alkyl, aryl, and alkaryl, used as nonvolatile in situ precursors to anti-fog agents for packaging films and a novel process of making such films.

17 Claims, No Drawings

REDUCED VOLATILITY PRECURSORS TO ANTI-FOG AGENTS

CROSS-REFERENCE TO RELATED APPLICATIONS

This application is a national filing under 35 U.S.C. 371 of International Application No. PCT/US98/16585, filed Aug. 11, 1998, which claims priority benefit of Provisional Application 60/055,503, filed Aug. 12, 1997.

FIELD OF THE INVENTION

The present invention concerns siloxane derivatives of poly(ether)alcohols used as nonvolatile in situ precursors to anti-fog, agents for packaging films and a novel process of making such films.

BACKGROUND OF THE INVENTION

Food items such as meats, produce, and a variety of other products, are often packaged in see-through plastic wraps and bags made of polyolefin film. Such see-through plastic films enable customers to see the contents of the package clearly. However, condensation of moisture on unmodified polyolefin film can cloud or fog the package reducing the visibility. Therefore, films having anti-fog properties are desirable. Anti-fog properties relate to the ability of the film surface to prevent or to dissipate the condensation of water vapor into small, discrete droplets on the surface of the film.

The food packaging industry uses surfactant additives to confer anti-fog properties on polyolefin film surfaces. The surfactants are added in sufficient quantity to make the polyolefin surfaces, which are normally hydrophobic, wettable. If water vapor condenses on the surface of the film, it tends to form a thin, transparent layer instead of the discrete, cloudy-looking droplets.

One way to incorporate additives, such an antistats and anti-fog agents, into polymer films is to co-extrude the additive with the polymer, see J. P. Trotoir; Mod. Plast. 65(10) 102, 105–6 (1988).

A variety of additives for use with various film-making materials are known. See, for example, U.S. Pat. No. 2,561,010, which discloses the dispersion of various surfactants, such as hydrophilic fatty acid esters and polyoxyethylene ethers, in hydrophobic polymers used to make films, such as polyvinyl chloride, polyethylene, and cellulose acetate. U.S. Pat. No. 3,542,713 relates to the addition of polyoxyalkylene monoesterified with a fatty acid and a poly-alcohol esterified with a fatty acid to a poly(vinyl chloride) film.

It is known in the literature that certain akyl(polyether) alcohols are useful as anti-fog agents through their surfactant properties. Unfortunately, the use of these materials in such applications is limited by the problems that they cause during manufacture of the films. Their volatility which is low, is still sufficient to cause build-up around die lips of extruders for blown films. This build-up can cause imperfections in the film after extrusion or can even lead to shutdown of the process when the film bubble ruptures. PCT International Publication WO95/18845 describes the use of a composition comprising the following additives (i) a monoester of glycerol with a saturated or unsaturated fatty acid, (ii) a di-ester of a glycerol with a saturated or unsaturated fatty acid, and (iii) at least one ether of a polyoxyethylene with a fatty alcohol in films having anti-fog properties.

Polyoxyethylene (4) lauryl ether ($HO(CH_2CH_2O)_4(CH_2)_{11}CH_3$), a commercially available polyoxyethylene fatty alcohol, known as BRIJ®, is similar to the compositions used in anti-fog applications. However, it undergoes a 17% weight loss at 200° C. (64% at 300° C.).

It is an object of the present invention to produce a polyolefin film which has latent anti-fog properties. It is an object of the present invention to provide a process for preparing such a film in a way that eliminates or decreases the amount of loss of an anti-fog agent during preparation. It is another object of the present invention to provide a process for preparing anti-fog film that reduces or eliminates the amount of build-up around the processing equipment, such as die lips of extruders, and the process problems evolving from such build-up, such as drips, and film bubble rupture.

SUMMARY OF THE INVENTION

The present invention provides an improved process for the production of a polyolefin film having anti-fog properties, said improvement comprising adding an alkyl (polyether)siloxane compound to a composition comprising a polyolefin prior to formation of a film from said composition and the added siloxane compound.

The present invention also provides a composition, comprising a polyolefin and an alkyl(polyether)siloxane compound.

The present invention further provides a mono- or multi-layer film composition having latent anti-fog properties, wherein at least one external layer comprises a polyolefin, characterized in that said latent anti-fog properties are obtained by incorporating in said film from about 0.05 to about 5% by weight of a composition comprising an alkyl (polyether)siloxane.

DETAILED DESCRIPTION

The conventional approach to the problem of reducing the tendency of plastic films (or other articles) to fog has been to apply a surface chemical treatment or else to make the surface hydrophilic by using surfactant additives, so that condensed water spreads and forms a continuous layer instead of tiny droplets (fog) on the surface. In the present invention, a latent anti-fog polyolefin composition comprising siloxane derivatives of alkyl(polyether)alcohols is used to obtain anti-fog properties which composition when formed into a film favorably compares with or exceeds the anti-fog properties of conventional films. There are several advantages to using the siloxane compounds of the present invention which include among others their relative hydrolytic stability at ambient temperature and their low volatility at the processing temperatures of the polymer with which they will be co-extruded as compared to the alkyl(polyether) alcohols themselves. Siloxane derivatives exhibit herein consistently lower weight loss at typical processing temperatures of about 200° C. to about 300° C. than the corresponding free surfactant. The anti-fog siloxane precursor compounds can also be extruded without die build-up.

The siloxane derivatives act as anti-fog agent precursor compounds which upon contact with water or atmospheric moisture react to form the corresponding alkyl(polyether) alcohols which alcohols impart the anti-fog properties to the film formed from the polyolefin composition.

The anti-fog agent precursor compounds are siloxane derivatives of alkyl(polyether)alcohols. Suitable siloxane derivatives of alkyl(polyether)alcohols can be of formula I:

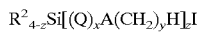

wherein:
Q is OCH$_2$CH$_2$, OCH$_2$CHCH$_2$, or any combination of one or more units of OCH$_2$CH$_2$ and OCH$_2$CHCH$_2$;
A is O, OC$_6$H$_4$, S, NH, NR, O—C(O)—;
R is alkyl, aryl, or alkaryl;
x is greater than 2 and less than 100;
y is greater than 0; except when A=OC$_6$H$_4$, then y is greater than or equal to 0;
z is 1 to 4; and
each R$^2$ is independently selected from the group consisting of: alkyl, aryl, or alkaryl.

Preferably, Q is OCH$_2$CH$_2$; A is O or OC$_6$H$_4$, x is greater than 4 and less than 20; y is greater than 5 and less than 30, when A is O; y is greater than 5 and less than 10, when A is OC$_6$H$_4$; and z is 2 to 4.

A decrease in volatility results from the coupling of two or more of the alkyl(polyether)alcohols. When z is 2 or greater, it is preferred that R$^2$ contain four or more carbon atoms; benzl, hexyl and octyl are most preferred. Since it is known that trimethylsilyl (TMS) derivatives of alcohols are sometimes used to increase their volatility, when z is 1, at least one R$^2$ should be other than methyl.

The fragment, Q, can be a poly(oxyethylene) fragment, (OCH$_2$CH$_2$)$_x$, derived from ethylene oxide, and may also contain fragments derived from propylene oxide; thus it can contain some —OCH$_2$CHCH$_2$— units in place of the OCH$_2$CH$_2$ units. The alkyl fragment in the ether unit, (CH$_2$)$_y$, is usually linear, but may be branched.

Representative examples of siloxanes of Formula I are dodecyltri(polyoxyethylene (4) dodecyl ether)silane, dodecyltri(polyoxyethylene (8) stearic acid ester)silane, dodecyltri(polyoxyethylene (5) nonylphenyl ether)silane, dodecyltri(polyoxyethylene (10) oleyl ether)silane,
  phenyltri(polyoxyethylene (4) dodecyl ether)silane,
  phenyltri(polyoxyethylene (8) stearic acid ester)silane,
  phenyltri(polyoxyethylene (5) nonylphenyl ether) silane,
  phenyltri(polyoxyethylene (10) oleyl ether)silane,
    benzyltri(polyoxyethylene (4) dodecyl ether)silane,
    benzyltri(polyoxyethylene (8) stearic acid ester)silane,
  benzyltri(polyoxyethylene (5) nonylphenyl ether)silane,
  benzyltri(polyoxyethylene (10) oleyl ether)silane,
    diphenyldi(polyoxyethylene (4) dodecyl ether)silane,
    diphenyldi(polyoxyethylene (8) stearic acid ester) silane,
  diphenyldi(polyoxyethylene (5) nonylphenyl ether)silane,
  diphenyldi(polyoxyethylene (10) oleyl ether)silane,
    methylphenyldi(polyoxyethylene (4) dodecyl ether) silane,
    methylphenyldi(polyoxyethylene (4) isododecyl ether) silane,
    isobutylphenyldi(polyoxyethylene (4) dodecyl ether) silane,
    methylphenyldi(polyoxyethylene (8) stearic acid ester) silane,
    methylphenyldi(polyoxyethylene (5) nonylphenyl ether) silane,
  phenyltri(copoly(oxyethylene (4) oxypropylene (2)) dodecyl ether)silane,
  butylphenyldi(polyoxyethylene (4) isononyl ether)silane,
  phenyltri(polyoxyethylene (5) isononylphenyl ether) silane,
  phenyltri(polyoxypropylene (5) nonylphenyl ether)silane,
    isobutylphenyldi(polyoxyethylene (4) dodecyl ether) silane, and
  methylphenyldi(polyoxyethylene (10) oleyl ether)silane.

Siloxane derivatives of formula II can also be used herein as anti-fog agent precursor compounds:

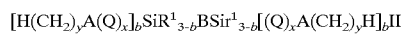

wherein:
Q is OCH$_2$CH$_2$, OCH$_2$CHCH$_2$, or any combination of one or more units of OCH$_2$CH$_2$ and OCH$_2$CHCH$_2$;
A is O, OC$_6$H$_4$, S, NH, NR, O—C(O)—;
R is alkyl, aryl, or alkaryl;
B is O, C$_6$H$_4$, —(CH$_2$)$_q$—, and hydrocarbylene;
q is greater than 1 and less than 30;
x is greater than 2 and less taan 100;
y is greater than 0; except when A is OC$_6$H$_4$, then y is greater than or equal to 0;
b is 1 to 3; and
each R$^1$ is independently selected from the group consisting of: alkyl, aryl, or alkaryl.

Preferably for formula II, Q is CH$_2$CH$_2$O; A is O or C$_6$H$_4$; B is O, C$_6$H$_4$, or —(CH$_2$)$_2$—; x is greater than 4 and less than 20; y is greater than 5 and less than 30; R is alkyl or benzyl; R$^1$ is alkyl; b is greater than 1; and q is 2.

Representative examples of formula II are bis-1,2-(dodecyldi(polyoxyethylene (4) dodecyl ether)silyl)ethane; oxy-bis-(dodecyldi(polyoxyethylnee(8) stearic acid ester) silane); bis(dodecyldi(polyoxyethylene (5) nonylphenyl ether)silyl)methane; bis-1,4-(tri(polyoxyethylnee (10) oleyl ether)silyl)benzene, bis(dibutyl(polyoxyethylene (4) dodecyl ether)siloxy)dibutylsilane; oxybis(tri(polyoxyethylene (8) stearic acid ester)silane); tris(benzyldi(polyoxyethylene (5) nonylphenyl ether)siloxy)benzylsilane; bis-1,2-(methyldi(polyco(oxyethylene (4) oxypropylene (2)) nonylphenyl ether)disilylethane, and dimethyltetra (polyoxyethylene (1) oleyl ether)disilylethane.

The siloxane derivatives of poly(ether)alcohols can be made by conventional techniques. For example, a general reaction of poly(ether)alcohols with chlorosilanes is shown in Scheme I below, wherein R$^2$ and z are defined as in Formula I above.

Scheme 1

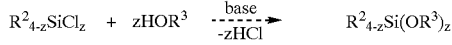

This synthesis involves the reaction of a chlorosilane, which may be alkyl, aryl or alkaryl substituted, with a desired alkyl(polyether)alcohols derivative in the presence of a base as an acid scavenger.

Suitable alkyl(polyether)alcohols are polyoxyethylene ethers. Representatives of these H—OR$^3$ compounds are polyoxyethylene(4)lauyl ether which is HO(CH$_2$CH$_2$O)$_4$C$_{12}$H$_{25}$ known as BRIJ®30; HO(CH$_2$CH$_2$O)$_5$C$_6$H$_4$C$_9$H$_{19}$ known as IGEPAL®CO-520; HO(CH$_2$CH$_2$)$_8$COC$_{17}$H$_{35}$ known as MYRJ®45; HO(CH$_2$CH$_2$O)$_{10}$(CH$_2$)$_8$C=C(CH$_2$)$_8$ CH$_3$ known as BRIJ®97; all (and others) commercially available from either Aldrich, Milwaukee, Wis. or ICI Surfactants, Wilmington, Del. The starting poly(ether) alcohol surfactants (H—OR$^3$ compounds) as shown above are well-defined, monodisperse species. However, their commercial syntheses can result in distributions of products centered around the quoted formulas.

Suitable chlorosilanes can have $R^2$ groups, such as —$(CH_2)_{12}CH_3$, —Ph, —$CH_3$, and —$CH_2Ph$. Representative chlorosilanes are dodecyltrichlorosilane, phenyltrichlorosilane, benzyltrichlorosilane, diphenyldichlorosilane, phenylmethyldichlorosilane, and $(CH_2)_2(Si(CH_3)Cl_2)_2$.

Despite the presence of an acid-scavenger, an acidic micro environment around silicon is unavoidable due to steric crowding. The tendency of siloxanes to self-condense is unavoidable due to steric crowding. The tendency of siloxanes to self-condense under acidic conditions produces T- and D- structures in addition to the desired siloxanes. However. the presence of these species are not believed to affect the anti-fog properties. The final product after the hydrolysis of the siloxane precursors is anticipated to be silica which should not diminish the usefulness of the film because many commercial polymer films contain silica or alumina as additives.

A variety of different bases and different solvents can be used in preparing the siloxanes compounds. Suitable bases are carbonates, amines and pyridines. Representative bases are $K_2CO_3$, triethylamine ($Et_3N$), and poly(4-vinylpyridine) (PVP). Suitable solvents are organic. Representative solvents are $CH_2Cl_2$, diethyl ether, tetrahydrofuran (THF) and dimethylformamide (DMF). For the reaction of dodecyltrichlorosilane with polyoxyethylene 4 lauryl ether, triethylamine in dichloromethane is preferred.

The compounds of Formula II can be prepared in a similar fashion to the specific process detailed in Method D at the beginning of the Example section below.

The term "polyolefin" means any thermoplastic, film-forming polymer obtained by polymerization or copolymerization of olefins with other monomers, wherein the olefin units are present in amounts greater than the other monomers. Virgin or recycled polyolefin can be used. Non-limitative examples of suitable polyolefins are: low density polyethylene (LDPE), linear low density polyethylene (LLDPE), linear medium density polyethylene (LMDPE), linear very-low density polyethylene (VMDPE), linear ultra-low density polyethylene (UMDPE), high density polyethylene (HDPE), polypropylene (PP), syndiotactic polypropylene (SPP), propylene/ethylene copolymers, propylene/alpha-olefin copolymers or terpolymers, the so-called polyethylene interpolymers, that is to say the copolymers of ethylene with alpha-olefins characterized by a narrow distribution of the molecular weights and obtained by means of polymerization with metalocene catalysts (see EP-A-416, 815 and U.S. Pat. No. 4,306,041), the copolymers of ethylene with other monomers, in particular with vinyl acetate, (EVA), wherein the ethylene units are present in an amount greater than those of vinyl acetate, and the blends thereof, in any proportion. The term "LLDPE" means the copolymers of ethylene with one or more comonomers, preferably selected among the alpha-olefins, such as butene, octene, hexene, pentene, methylpentene, etc., wherein the molecules of these copolymers comprise long chains with few branches. Generally LLDPE has a density ranging from about 0.916 g/cc to about 0.925 g/cc. The term "LMDPE" means ethylene copolymers as defined above for LLDPE, characterized by a density usually ranging from about 0.926 g/cc to about 0.941 g/cc. The term "VLDPE" means linear ethylene copolymers characterized by a density lower than about 0.860 g/cc. The term "EVA" identifies a copolymer formed by monomers of ethylene and vinyl acetate wherein the units derived from the ethylene monomer in the copolymer are present in a larger amount, preferably in an amount ranging from about 60 to about 98% by weight on the total weight of the copolymer.

The polyolefin composition can be formed into a monolayer film or used in a multilayer film with other layers of the same or different polymers or blends of polymers that provide other useful properties such as thermal resistance, abuse resistance, oxygen and moisture barrier. The siloxane derivative compound can be incorporated in the polymer or in a blend of film-forming polymers before or during formation of the film, such as by extrusion. In particular, the siloxane derivative compound can be mixed intimately with the polymers in which it is to be incorporated, when the extruder is loaded. Or, incorporation can be carried out beforehand, by means of the passage of the polymer and the anti-fog agent precursor compound through a single- or twin-screw extruder and pelletization of the thus obtained product to be later loaded in the extruder. Alternatively, with this latter system, it is possible to prepare a so-called "master batch", in practice a polymer having a high concentration of anti-fog precursor compounds that will later be mixed with the polymer in which said composition is to be incorporated at the moment of extrusion and in an appropriate quantity to provide the desired percentage of anti-fog precursor compound.

In the masterbatch embodiment, the base polymer used for the preparation of the masterbatch can be the same as that in which it is desired to incorporate the anti-fog precursor compound, or it can also be different as long as it is compatible with the latter.

In the case of multi-layer films, the anti-fog precursor compounds of the present invention will not necessarily have to be incorporated in the polymer or in the blend of polymers forming the external layer, where the term "external layer" means that surface layer of the film that will later become the internal surface—facing the product having a high moisture content—of the final package. Should the layer adjacent to the external layer allow the migration of the anti-fog precursor compound without interfering with it, the additive can be incorporated in such more internal layer.

A situation of this type takes place when the layer adjacent to the external one is a polyolefin layer as defmed above. In the case of films having more than three layers, when their polymer composition allows it, the additive can be incorporated in an even more internal layer or to split in all the layers.

If the film is symmetrical, the siloxane precursor compound can be incorporated either only in the "external layer" as defined above or, in both surface layers.

The total amount of the precursor compound will be about 0.05 to about 5% and, preferably, from about 1.0 to about 3.5% by weight of the total weight of the polyolefin composition or the film of the present invention.

The polyolefin composition can be formed into a monolayer or multilayer film by the usual methods, including hot pressing, extrusion, coextrusion, casting, pressing, spray coating, dip coating, extrusion coating, solution coating, lamination, extrusion lamination, and combinations thereof.

Owing to their hydrophilicity, the anti-fog siloxane precursor compounds absorb moisture. When the film is exposed to water or atmospheric humidity, the precursor compounds undergo hydrolysis to liberate the corresponding alkyl(polyether)alcohols in filly active form thereby providing anti-fog properties to the resulting film. Exposure to a polar medium/moisture can be conveniently done by, for example, running an extruded film through a water bath or between water-saturated spongy rollers, passing the film through a steam or controlled humidity chamber, or passing the film between glass rollers. Mere exposure to the air can also accomplish this conversion. A by-product of the hydrolysis reaction is believed to be silica or a silica derivative, which can remain in the film, posing no end-use problems. The conversion of the siloxane derivative anti-fog precursor compounds to their alcohol form depends on time, temperature and relative humidity.

This reaction is a surface reaction. The siloxanes in the film itself may not convert at all, or may do so more slowly, as they migrate to the surface. The alkyl(polyether)siloxanes can be master-batched in the polyolefin under anhydrous conditions to yield a relatively moisture stable masterbatch. Letdown in an extruder at the melting point of the polyolefin may cause no hydrolysis of the siloxanes, but the thin film extruded and blown at the other end of the extruder has high surface area, enhancing reaction with atmospheric moisture.

after which the solid was filtered off and the filtrate concentrated to give the product.

For example, 1.5 ml $C_{12}H_{25}SiCl_3$ was added to a mixture of poly(4-vinylpyridine)(PVP;1.6 g) and BRIJ®30 (5.61 g) in $CH_2Cl_2$(20 ml). 98% of the expected product was recovered. Weight loss at 300° C. was 16.

Method B:

To a solution of a polyoxyethylene ether (3 eq.) in 20 ml $CH_2Cl_2$ was added a trichlorosilane (1 eq.), followed by the addition of triethylamine (3 eq.). The mixture was stirred at room temperature for 16 h and then concentrated. The residue was treated with diethyl ether. Insoluble triethylamine-salt was filtered off and the filtrate concentrated to give the product.

Method C:

This procedure was similar to Method B except that 2 eq. each of a polyoxyethylene ether and triethylamine were used.

Method D:

This procedure was similar to Method B except that 4 eq. each of a polyoxyethylene ether and triethylamine were used.

TABLE 1

| Sample No. | Chlorosilane | Amt. (ml) | Alcohol.* | Amt. (g) | Base | Amt (ml) | Method | Product Recovery % of Expected |
|---|---|---|---|---|---|---|---|---|
| S37 | $C_{12}H_{25}SiCl_3$ | 0.5 | HO(B30) | 1.871 | $Et_3N$ | 0.70 | B | 95 |
| S41 | $PhSiCl_3$ | 0.3 | HO(B30) | 2.088 | $Et_3N$ | 0.78 | B | 97 |
| S45 | $PhCH_2SiCl_3$ | 0.3 | HO(B30) | 1.897 | $Et_3N$ | 0.71 | B | 100 |
| S49 | $Ph_2SiCl_2$ | 0.5 | HO(B30) | 1.767 | $Et_3N$ | 0.66 | C | 98 |
| S53 | $Ph(CH_3)SiCl_2$ | 0.4 | HO(B30) | 1.829 | $Et_3N$ | 0.69 | C | 96 |
| S57 | $(CH_2)_2[Si(CH_3)Cl_2]_2$ | 0.387(g) | HO(B30) | 2.257 | $Et_3N$ | 0.85 | D | 99 |
| S38 | $C_{12}H_{25}SiCl_3$ | 0.5 | HO(CO-520) | 2.297 | $Et_3N$ | 0.70 | B | 97 |
| S42 | $PhSiCl_3$ | 0.3 | HO(CO-520) | 2.564 | $Et_3N$ | 0.78 | B | 100 |
| S46 | $PhCH_2SiCl_3$ | 0.3 | HO(CO-520) | 2.329 | $Et_3N$ | 0.71 | B | 100 |
| S50 | $Ph_2SiCl_2$ | 0.5 | HO(CO-520) | 2.169 | $Et_3N$ | 0.66 | C | 99 |
| S54 | $Ph(CH_3)SiCl_2$ | 0.4 | HO(CO-520) | 2.245 | $Et_3N$ | 0.69 | C | 91 |
| S58 | $(CH_2)_2[Si(CH_3)Cl_2]_2$ | 0.357 (g) | HO(CO-520) | 2.543 | $Et_3N$ | 0.78 | D | 100 |

*HO(B30) = BRIJ ® 30, $HO(CH_2CH_2O)_4(CH_2)_{11}CH_3$
HO(CO-520) = IGEPAL ® CO-520, $HO(CH_2CH_2O)_5C_6H_4(CH_2)_8CH_3$

Further additives may also be included in the composition of the present invention to impart properties desired for the particular film or article being manufactured. Such additives include, but are not necessarily limited to, fillers, pigments, dyestuffs, antioxidants, stabilizers, processing aids, plasticizers, fire retardants, and the like.

EXAMPLES

General methods used for the syntheses of siloxanes are described below. Reaction data for the individual samples are listed in Table 1. For all samples listed in Table 1, the molecular weight distributions for the reacting poly(ether) alcohol surfactants were taken into account, except in S31, S32 and S33. Hence, the amount of surfactants used were calculated from their equivalent weights.

Method A:

A trichlorosilane was added to a mixture of poly (4vinylpyridine)(PVP;1–2 g) and a polyoxyethylene ether (3 eq.) in $CH_2Cl_2$ (20 mm). Reaction progress was followed by IR. The mixture was stirred at room temperature for 16 h

EXAMPLES 1–12 AND COMPARATIVE EXAMPLES A AND B

Thermogravimetric Analysis(TGA)

TGA were done on free polyetheralcohol surfactants and siloxane derivatives thereof. Percent weight loss at 200° C. and 300° C. are listed for the suriactants and the siloxane derivatives in Table 2. Siloxane derivatives show consistently lower weight-loss at both temperatures than the corresponding free surfactant. Low weight loss is desirable because it indicates lower volatility of the compound under processing conditions and as a result, reduced fouling of the processing equipment. Compound lost due to volatility can shut down the process because the die of the extruder is te first cold surface that the compounds come in contact with, so that is where they collect. They then can drip back onto the film or (worse) cause the film bubble to fail.

TABLE 2

Percent Weight Loss Data of the Siloxanes R'R"$_n$Si(OR)$_{3-n}$ at Selected Temperatures (TGA)

| Example: Sample | | At 200° C. | | At 300° C. | |
|---|---|---|---|---|---|
| | | R = B30* | R-CO520** | R = B30 | R = CO520 |
| A: R = B30 | Free Surfactant | 17 | 2 | 64 | 46 |
| B: R = CO520 | | | | | |
| 1: S37 | n = 0 | 7 | 2 | 27 | 20 |
| 2: S38 | R' = C$_{12}$H$_{25}$ | | | | |
| 3: S41 | n = 0 | 7 | 1 | 34 | 13 |
| 4: S42 | R' = Ph | | | | |
| 5: S45 | n = 0 | 7 | 1 | 38 | 16 |
| 6: S46 | R' = Bz | | | | |
| 7: S49 | n = 1 | 4 | 1 | 21 | 13 |
| 8: S50 | R' = Ph, R" = Ph | | | | |
| 9: S53 | n = 1, | 1 | 2 | 23 | 21 |
| 10: S54 | R' = Ph, R" = Me | | | | |
| 11: S57 | n = 1, R' = Me, | 8 | 1 | 35 | 19 |
| 12: S58 | R" = CH$_2$CH$_2$SiCH$_3$ | | | | |

*B30 = (CH$_2$CH$_2$O)$_4$(CH$_2$)$_{11}$CH$_3$
**CO520 = (CH$_2$CH$_2$O)$_5$C$_6$H$_4$(CH$_2$)$_8$CH$_3$

EXAMPLES 13–24 AND COMPARATIVE EXAMPLES C, D AND E

Anti-fog Testing of Polyethylene Films

Blends of polyethylene (PE) were made with alkyl (polyether)alcohol surfactants or with their siloxane derivatives. The surfactant (or the siloxane derivative, 0.5 g) was added to a slurry of polyethylene powder (medium density, 24.5 g) in 1,2-dichloroethane (180 ml), and the resulting mixture was refluxed for 4 h. After cooling and evaporating the solvent under vacuum, the surfactant (or siloxane)/PE blend was obtained as a white powder. The amount of surfactant or siloxane derivative in the blends was 2%.

Films (3"×5") were pressed between two layers of KAPTON® sheets with 0.5 mm aluminum foil spacer, at 120° C. under a pressure of 12,000 psi (82,737 kPa). The films made from polyethylene as well as PE blends were tested for fog formation at 5 min., 25 min., and 2 h. A 1"×1" piece of the film was placed over the mouth of a 20 ml scintillation vial, containing 15 ml water, and put in a refrigerator. Fogging was observed and the results were assessed on a scale of 1–5, where:

1=very poor, opaque
2=poor, slightly larger droplets, almost opaque
3=acceptable, some opaque droplets, but surface of the water in the vial visible
4=good, larger transparent droplets
5=excellent, alost no water droplets on the film

TABLE 3

| Example Number | Composition of the Film | Assessment | | |
|---|---|---|---|---|
| | | 5 min | 25 min | 2 hrs |
| C | PE | 1 | 1 | 1 |
| D | BRIJ 30 on PE | 2 | 2 | 3 |
| 13 | S37 on PE | 2 | 2 | 2 |
| 14 | S41 on PE | 3 | 3 | 3 |
| 15 | S45 on PE | 3 | 3 | 3 |
| 16 | S49 on PE | 3 | 3 | 3 |
| 17 | S53 on PE | 2 | 2 | 3 |
| 18 | S57 on PE | 4 | 4 | 4 |

TABLE 3-continued

| Example Number | Composition of the Film | Assessment | | |
|---|---|---|---|---|
| | | 5 min | 25 min | 2 hrs |
| E | IGEPAL ® CO-520 on PE | 4 | 4 | 4 |
| 19 | S38 on PE | 4 | 4 | 4 |
| 20 | S42 on PE | 4 | 4 | 4 |
| 21 | S46 on PE | 5 | 5 | 5 |
| 22 | S50 on PE | 5 | 4 | 4 |
| 23 | S54 on PE | 4 | 4 | 4 |
| 24 | S58 on PE | 4 | 4 | 4 |

It is clear from this example that the siloxanes are ultimately equally as effective as the surfactants from which they are derived.

EXAMPLE 25

Dodecyltri(polyoxyethylene (4) dodecyl ether)silane Masterbatch in Polyethlene (25% Blend)

Dodecyltris(polyoxyethylene-(4)-dodecyl ether)silane (62.98 g) was added to a slurry of polyethylene (PE) powder (medium density; 187 g) in 1,2-dichlorethane, and the resulting mixture was refluxed for 20 h. After cooling and evaporating the solvent under vacuum, the siloxane/PE blend was obtained as a white powder (246 g). This material was suitable as a masterbatch concentrate.

EXAMPLE 26

Dodecyltri[polyoxyethylene (4) dodecyl ether]silane (62.98 g) was added to a slurry of polyethylene powder (medium density; 187 g) in 1,2-dichloroethane and the resulting mixture refluxed for 20 h. After cooling and evaporating the solvent under vacuum, the siloxane/PE blend was obtained as a white powder (246 g) with about 14–20% being the siloxane. Film was prepared using the siloxane/PE blend material at a 5% loading in a film base of 57% Dow Attane 4201 ULDPE, 20% Dow 503 tubular LDPE, 15% Dow Dowlex 2045A LLDPE and 8% DuPont Elvax 3135X EVA. 0.3% of glyceryl monostearate and 0.26% silica was also added. The amount of siloxane in the final composition was in the range of about 0.07–0.10%. Testing of the anti-fog film consisted of observation of overwrapped trayed meats in a refrigerated display case. The films exhibited good anti-fog properties in tests with pork at short intervals (1–24 hrs) after packaging.

What is claimed is:

1. An improved process for the production of a polyolefin film having anti-fog properties, said improvement comprising: adding a compound of Formula I $$R^2{}_{4-z}Si[(Q)_xA(CH_2)_yH]_z I$$

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
x is greater than 2 and less than 100;
y is greater than 0; except when A=$OC_6H_4$, then y is greater than or equal to 0;
z is 1 to 4; and
each $R^2$ is independently selected from the group consisting of alkyl, aryl and alkaryl;
or of Formula II $$[H(CH_2)_yA(Q)_x]_bSiR^1{}_{3-b}BSiR^1{}_{3-b}[(Q)_xA(CH_2)_yH]_b II$$

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
B is O, $C_6H_4$, —$(CH_2)_q$—, and hydrocarbylene;
q is greater than 1 and less than 30;
x is greater than 2 and less than 100;
y is greater than 0; except when A is $OC_6H_4$, then y is greater than or equal to 0;
b is 1 to 3; and
each $R^1$ is independently selected from the group consisting of alkyl, aryl, and alkaryl to a composition comprising a polyolefin prior to formation of a film.

2. The process of claim 1 wherein the amount of the compound of Formula I or Formula II added is about 0.05 to about 5% by weight.

3. The process of claim 1 wherein the polyolefin is selected from the group consisting of: polyethylene, a copolymer of polyethylene, polypropylene, and a copolymer of polypropylene.

4. The process of claim 1 wherein the compound is of Formula I.

5. The process of claim 1 wherein A is selected from the group consisting of: O, $OC_6H_4$, and OC=O.

6. The process of claim 5 wherein the compound is selected from the group consisting of: dodecyltri(polyoxyethylene (4) dodecyl ether)silane, dodecyltri(polyoxyethylene (8) stearic acid ester)silane, dodecyltri(polyoxyethylene (5) nonylphenyl ether)silane, dodecyltri(polyoxyethylene (10) oleyl ether)silane, phenyltri(polyoxyethylene (4) dodecyl ether)silane, phenyltri(polyoxyethylene (8) stearic acid ester)silane, phenyltri(polyoxyethylene (5) nonylphenyl ether)silane, phenyltri(polyoxyethylene (10) oleyl ether)silane, benzyltri(polyoxyethylene (4) dodecyl ether)silane, benzyltri(polyoxyethylene (8) stearic acid ester)silane, benzyltri(polyoxyethylene (5) nonylphenyl ether)silane, benzyltri(polyoxyethylene (10) oleyl ether)silane, diphenyldi(polyoxyethylene (4) dodecyl ether)silane, diphenyldi(polyoxyethylene (8) stearic acid ester)silane, diphenyldi(polyoxyethylene (5) nonylphenyl ether)silane, diphenyldi(polyoxyethylene (10) oleyl ether)silane, methylphenyldi(polyoxyethylene (4) dodecyl ether)silane, methylphenyldi(polyoxyethylene (4) isododecyl ether)silane, isobutylphenyldi(polyoxyethylene (4) dodecyl ether)silane, methylphenyldi(polyoxyethylene (8) stearic acid ester)silane, methylphenyldi(polyoxyethylene (5) nonphenyl ether)silane, methylphenyldi(polyoxyethylene (10) oleyl ether)silane, dimethyltetra(polyoxyethylene (4) dodecyl ether)disilylethane, dimethyltetra(polyoxyethylene (8) stearic acid ester)disilylethane, dimethyltetra(polyoxyethylene (5) nonylphenyl ether)disilylethane, and dimethyltetra(polyoxyethylene (1) oleyl ether)disilylethane.

7. The process of claim 1 wherein the compound is of Formula II.

8. The process of claim 7 wherein the compounds is selected from the group consisting of: bis-1,2-(dodecyldi(polyoxyethylene (4) dodecyl ether)silyl)ethane; oxy-bis-(dodecyldi(polyoxyethylnee(8) stearic acid ester)silane); bis(dodecyldi(polyoxyethylene (5) nonylphenyl ether)silyl)methane; bis-1,4-(tri(polyoxyethylnee (10) oleyl ether)silyl)benzene, bis(dibutyl(polyoxyethylene (4) dodecyl ether)siloxy)dibutylsilane; oxybis(tri(polyoxyethylene (8) stearic acid ester)silane); tris(benzyldi(polyoxyethylene (5) nonylphenyl ether)siloxy)benzylsilane; bis-1,2-(methyldi(polyco(oxyethylene (4) oxypropylene (2)) nonylphenyl ether)disilylethane, and dimethyltetra(polyoxyethylene (1) oleyl ether)disilylethane.

9. A composition, comprising: a polyolefin and a compound of Formula I $$R^2{}_{4-z}Si[(Q)_xA(CH_2)_yH]_z I$$

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
x is greater than 2 and less than 100;
y is greater than 0; except when A=$OC_6H_4$, then y is greater than or equal to 0;
z is 1 to 4; and
each $R^2$ is independently selected from the group consisting of alkyl, aryl and alkaryl;
or of Formula II $$[H(CH_2)_yA(Q)_x]_bSiR^1{}_{3-b}BSiR^1{}_{3-b}[(Q)_xA(CH_2)_yH]_b II$$

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
B is O, $C_6H_4$, —$(CH_2)_q$—, and hydrocarbylene;
q is greater than 1 and less than 30;
x is greater than 2 and less than 100;
y is greater than 0; except when A is $OC_6H_4$, then y is greater than or equal to 0;
b is 1 to 3; and
each $R^1$ is independently selected from the group consisting of alkyl, aryl, and alkaryl.

10. The composition of claim 9 wherein the amount of the compound of Formula I or Formula II is about 0.05 to about 5% by weight based on the total weight of the composition.

11. The composition of claim 9 wherein the polyolefin is selected from the group consisting of: polyethylene, a copolymer of polyethylene, polypropylene, and a copolymer of polypropylene.

12. The composition of claim 9 wherein the compound is of Formula I.

13. The composition of claim 12 wherein A is selected from the group consisting of: O, $OC_6H_4$, and OC=O.

14. The composition of claim 13 wherein the compound is selected from the group consisting of: dodecyltri (polyoxyethylene (4) dodecyl ether)silane, dodecyltri (polyoxyethylene (8) stearic acid ester)silane, dodecyltri (polyoxyethylene (5) nonylphenyl ether)silane, dodecyltri (polyoxyethylene (10) oleyl ethersilane, phenylti (polyoxyethylene (4) dodecyl ether)silane, phenyltri (polyoxyethylene (8) stearic acid ester)silane, phenyltri (polyoxyethylene (5) nonylphenyl ether)silane, phenyltri (polyoxyethylene (10) oleyl ether)silane, benzyltri (polyoxyethylene (4) dodecyl ether)silane, benzyltri (polyoxyethylene (8) estearic acid ester)silane, benzyltri (polyoxyethylene (5) nonylphenyl ether)silane, benzyltri (polyoxyethylene (10) oleyl ether)silane, diphenyldi (polyoxyethylene (4) dodecyl ether)silane, diphenyldi (polyoxyethylene (8) stearic acid ester)silane, diphenyldi (polyoxyethylene (5) nonylphenyl ether)silane, diphenyldi (polyoxyethylene (10) oleyl ether)silane, methylphenyldi (polyoxyethylene (4) dodecyl ethersilane, methylphenyldi (polyoxyethylene (4) isododecyl ether)silane, isobutylphenyldi(polyoxyethylene (4) dodecyl ether)silane, methylphenyldi(polyoxyethylene (8) stearic acid ester) silane, methylphenyldi(polyoxyethylene (5) nonphenyl ether)silane, methylphenyldi(polyoxyethylene (10) oleyl ether)silane, dimethyltetra(polyoxyethylene (4) dodecyl ether)disilylethane, dimethyltetra(polyoxyethylene (8) stearic acid ester)disilylethane, dimethyltetra (polyoxyethylene (5) nonylphenyl ether)disilylethane, and dimethyltetra(polyoxyethylene (1) oleyl ether)disilylehane.

15. The composition of claim 9 wherein the compound is of Formula II.

16. The composition of claim 15 wherein the compound is selected from the group consisting of: bis-1,2-(dodecyldi (polyoxyethylene (4) dodecyl ether)silyl)ethane; oxy-bis- (dodecyidi(polyoxyethylnee(8) stearic acid ester)silane); bis (dodecyldi(polyoxyethylene (5) nonylphenyl ether)silyl) methane; bis-1,4-(tri(polyoxyethylnee (10) oleyl ether)silyl) benzene, bis(dibutyl(polyoxyethylene (4) dodecyl ether) siloxy)dibutylsilane; oxybis(tri(polyoxyethylene (8) stearic acid ester)silane); tris(benzyldi(polyoxyethylene (5) nonylphenyl ether)siloxy)benzylsilane; bis-1,2-(methyldi (polyco(oxyethylene (4) oxypropylene (2)) nonylphenyl etherdisilylethane, and dimethyltetra(polyoxyethylene (1) oleyl ether)disilyieflane.

17. A mono- or multi-layer film composition having latent anti-fog properties, wherein at least one external layer comprises a polyolefin, characterized in that said latent anti-fog properties are obtained by incorporating in said film from about 0.05 to about 5% by weight of a composition comprising a compound of Formula I

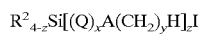

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
x is greater than 2 and less than 100;
y is greater than 0; except when A=$OC_6H_4$, then y is greater than or equal to 0;
z is 1 to 4; and
each $R^2$ is independently selected from the group consisting of alkyl, aryl and alkaryl;
or of Formula II

wherein:
Q is $OCH_2CH_2$, $OCH_2CHCH_2$, or any combination of one or more units of $OCH_2CH_2$ and $OCH_2CHCH_2$;
A is O, $OC_6H_4$, S, NH, NR, O—C(O)—;
R is alkyl, aryl, or alkaryl;
B is O, $C_6H_4$, —$(CH_2)_q$—, and hydrocarbylene;
q is greater than 1 and less than 30;
x is greater than 2 and less than 100;
y is greater than 0; except when A is $OC_6H_4$, then y is greater than or equal to 0;
b is 1 to 3; and
each $R^1$ is independently selected from the group consisting of: alkyl, aryl, or alkaryl.

* * * * *

UNITED STATES PATENT AND TRADEMARK OFFICE
CERTIFICATE OF CORRECTION

PATENT NO. : 6,225,391 B1
DATED : May 1, 2001
INVENTOR(S) : Parthjasarathy et al.

It is certified that error appears in the above-identified patent and that said Letters Patent is hereby corrected as shown below:

Title page,
ABSTRACT,
Line 3, change "$SiR^1_{3-b}SiR^1_{3-b}[(Q)_xA(CH_2)_yH]_b$" to -- $SiR^1_{3-b}SiR^1_{3-b}[(Q)_xA(CH_2)_yH]_b$ --.
Lines 4 and 5, change both instances of "$OCH_2CHCH_2$" to -- $OCH_2CHCH_3$ --.

Column 1,
Line 15, delete "," after "anti-fog".
Line 50, change "akyl(polyether)" to -- alkyl(polyether) --.

Column 3,
Line 1, change "$R^2_{4-z}Si[(Q)_xA(CH_2)_yH]_zI;$" to
-- $R^2_{4-z}Si[(Q)_xA(CH_2)_yH]_z$      I --.
Lines 4 and 5, change both instances of "$OCH_2CHCH_2$" to -- $OCH_2CHCH_3$ --.
Line 21, change "benzl" to -- benzyl --.
Line 29, change "-$OCH_2CHCH_2$-" to -- -$OCH_2CHCH_3$- --.

Column 4,
Line 8, change "$[H(CH_2)_yA(Q)_x]_bSiR^1_{3-b}BSir^1_{3-b}[(Q)_xA(CH_2)_yH]_bII$" to
-- $[H(CH_2)_yA(Q)_x]_bSiR^1_{3-b}BSir^1_{3-b}[(Q)_xA(CH_2)_yH]_b$      II --.
Lines 11 and 12, change both instances of "$OCH_2CHCH_2$" to -- $OCH_2CHCH_3$ --.
Line 31, change "oxy-bis-(dodecyldi(polyoxyethylnee (8) stearic acid ether ester) silane)" to -- oxy-bis-(dodecyldi(polyoxyethylene (8) stearic acid ether ester)silane) --.
Line 33, change "bis-1,4-(tri(polyoxythylnee (10) oleyl ether)silyl)benzene" to -- bis-1,4-(tri(polyoxythylene (10) oleyl ether)silyl)benzene --.
Line 59, change "lauyl" to -- lauryl --.

Column 6,
Line 48, change "defmed" to -- defined --.

Column 7,
Line 3, change "filly" to -- fully --.
Line 66, change "(20 mm)" to -- (20 mL) --.

Column 8,
Line 57, change "surlactants" to -- surfactants --.
Line 64, change "te" to -- the --.

UNITED STATES PATENT AND TRADEMARK OFFICE
CERTIFICATE OF CORRECTION

PATENT NO. : 6,225,391 B1
DATED : May 1, 2001
INVENTOR(S) : Parthjasarathy et al.

It is certified that error appears in the above-identified patent and that said Letters Patent is hereby corrected as shown below:

Column 10,
Line 46, change "Polyethlene" to -- Polyethylene --.

Column 11,
Line 12, change "$R^2_{4-z}Si[(Q)_xA(CH_2)_yH]_zI$" to -- $R^2_{4-z}Si[(Q)_xA(CH_2)_yH]_z$     I --.
Lines 15 and 16, change both instances of "$OCH_2CHCH_2$" to -- $OCH_2CHCH_3$ --.
Line 28, change "$[H(CH_2)_yA(Q)_x]_bSiR^1_{3-b}BSiR^1_{3-b}[(Q)_xA(CH_2)_yH]_bII$" to
-- $H(CH_2)_yA(Q)_x]_bSiR^1_{3-b}BSiR^1_{3-b}[(Q)_xA(CH_2)_yH]_b$     II --.
Lines 30 and 31, change both instances of "$OCH_2CHCH_2$" to -- $OCH_2CHCH_3$ --.

Column 12,
Line 1, change "estearic" to -- stearic --.
Line 12, change "nonphenyl" to -- nonylphenyl --.
Line 25, change "oxy-bis-(dodecyldi(polyoxyethylnee (8) stearic ether ester)silane)" to
-- oxy-bis-(dodecyldi(polyoxyethylene (8) stearic ether ester)silane) --.
Line 27, change "bis-1,4-(tri(polyethylnee (10) oleyl ether)silyl)benzene" to -- bis-1,
4-(tri(polyethylene (10) oleyl ether)silyl)benzene --.
Lines 40 and 41, change both instances of "$OCH_2CHCH_2$" to -- $OCH_2CHCH_3$ --.
Lines 55 and 56, change both instances of "$OCH_2CHCH_2$" to -- $OCH_2CHCH_3$ --.

Column 13,
Line 24, change "estearic" to -- stearic --.
Line 36, change "nonphenyl" to -- nonylphenyl --.
Line 49, change "oxy-bis-(dodecyldi(polyoxyehtylnee (8) stearic acid ether ester)
silane)" to -- oxy-bis-(dodecyldi(polyoxyethylene (8) stearic acid ether ester)silane) --.

Column 14,
Line 1, change "bis-1,4-(tri(polyoxyethylnee (10) oleyl ether)silyl)benzene" to -- bis-1,
4-(tri(polyoxyethylene (10) oleyl ether)silyl)benzene --.
Line 17, change "$R^2_{4-z}Si[(Q)_xA(CH_2)_yH]_zI$" to
-- $R^2_{4-z}Si[(Q)_xA(CH_2)_yH]_z$     I --.
Lines 20 and 21, change both instances of "$OCH_2CHCH_2$" to -- $OCH_2CHCH_3$ --.

UNITED STATES PATENT AND TRADEMARK OFFICE
CERTIFICATE OF CORRECTION

PATENT NO. : 6,225,391 B1
DATED : May 1, 2001
INVENTOR(S) : Parthjasarathy et al.

It is certified that error appears in the above-identified patent and that said Letters Patent is hereby corrected as shown below:

Column 14 contd.
Line 33, change "$[H(CH_2)_yA(Q)_x]_bSiR^1{}_{3-b}BSiR^1{}_{3-b}[(Q)_xA(CH_2)_yH]_bII$" to
-- $[H(CH_2)_yA(Q)_x]_bSiR^1{}_{3-b}BSiR^1{}_{3-b}[(Q)_xA(CH_2)_yH]_b \quad II$ --.
Lines 36 and 37, change both instances of "$OCH_2CHCH_2$" to -- $OCH_2CHCH_3$ --.

Signed and Sealed this

Twenty-third Day of April, 2002

Attest:

JAMES E. ROGAN
*Director of the United States Patent and Trademark Office*

*Attesting Officer*